(12) United States Patent
Hampton et al.

(10) Patent No.: US 12,016,323 B1
(45) Date of Patent: Jun. 25, 2024

(54) ANIMAL EUTHANASIA KIT AND METHOD

(71) Applicant: Mouse Specifics, Inc., Framingham, MA (US)

(72) Inventors: Thomas G. Hampton, Framingham, MA (US); Melissa B. Lewis, Waltham, MA (US)

(73) Assignee: Mouse Specifics, Inc., Framingham, MA (US)

( * ) Notice: Subject to any disclaimer, the term of this patent is extended or adjusted under 35 U.S.C. 154(b) by 101 days.

(21) Appl. No.: 17/752,656

(22) Filed: May 24, 2022

(51) Int. Cl.
*A01M 13/00* (2006.01)

(52) U.S. Cl.
CPC .................................. *A01M 13/003* (2013.01)

(58) Field of Classification Search
CPC .......... A61D 7/04; A22D 3/005; A22B 3/005; A01M 13/003
USPC ............................................ 43/129; 119/420
See application file for complete search history.

(56) References Cited

U.S. PATENT DOCUMENTS

| | | | | |
|---|---|---|---|---|
| 2,438,129 A * | 3/1948 | Hyman | .................... | A24F 25/02 239/59 |
| 3,515,302 A * | 6/1970 | Curran | ...................... | A61L 9/12 239/57 |
| 2014/0245964 A1* | 9/2014 | Stevens | ................ | A61K 31/035 119/420 |
| 2016/0242405 A1* | 8/2016 | Zhang | ................... | A01M 29/12 |

\* cited by examiner

*Primary Examiner* — Brady W Frazier
*Assistant Examiner* — Zoe Tam Tran
(74) *Attorney, Agent, or Firm* — Morse, Barnes-Brown & Pendleton, P.C.; Sean D. Detweiler, Esq.

(57) ABSTRACT

A method and apparatus for a kit is provided for euthanizing animals. The kit makes use of an enclosure and a canister. The enclosure is configured to hold one or more animals. The canister holds the reactants that are combined to form the euthanizing agent and provides a mechanism for the reactants to be delivered to and mixed together in the enclosure. The canister is designed and configured to allow for the reactants to be added rapidly and nearly simultaneously into a chamber while preventing one or more animals held in the enclosure from direct contact with the reactants.

21 Claims, 11 Drawing Sheets

ANIMAL EUTHANASIA KIT AND METHOD

FIELD OF THE INVENTION

The present invention relates to improved and convenient methods and means for terminating the lives of animals, such as laboratory animals.

BACKGROUND

Tens of millions of laboratory animals, mostly mice and rats, are used in research. These animals are typically housed in an enclosure 100 such as seen in FIG. 1. Typically, these enclosures 100 have a mesh or vented elevated floor 102 that supports the animal 200 at an offset 104 from the floor of the enclosure 100 while allowing waste materials to fall through the mesh or vented elevated floor 102.

At the end of a study, many millions of animals are sacrificed, which means their lives are terminated. There is much interest in the manner and mode of death for these lab animals, with great concern for the dignity of the animals, and the desire to minimize pain and distress to the animals during their lives as research animals, and also in their final moments of life.

Carbon dioxide ($CO_2$) is routinely used in the laboratory setting to euthanize animals, either to harvest tissue for research, to end the life of sick animals, or to cull colonies that are too difficult or costly to maintain. Routinely, laboratory animals are placed into a closed chamber connected by way of a hose to a tank that can dispense $CO_2$ gas. The gas is regulated to fill the chamber at a desired rate, and the animals first become unconscious and then die of asphyxiation. If the chamber is pre-filled with $CO_2$, the animals die quickly, but display signs of stress. If the animals are placed in the chamber filled with atmospheric air and $CO_2$ is gradually added to the chamber, the animals die more slowly but exhibit fewer signs of stress. Many publications exist debating the advantages and disadvantages of pre-filling vs. gradual filling of the chambers, but there is no consensus on the most humane method, in part due to the multitude of chamber sizes, tubing sizes, and $CO_2$ regulating devices available. Currently, there is an absence of chambers that are instrumented to determine the vital signs of animals in $CO_2$ chambers.

The $CO_2$ gas delivered via a tank is routinely used in the laboratory animal and research setting, but there is potential in using alternative forms of $CO_2$ gas, such as that which is generated by the sublimation of dry ice or the reaction of acetic acid [vinegar] with sodium bicarbonate [baking soda].

Previous approaches have involved combining baking soda and vinegar in an enclosure 100 to create the $CO_2$ gas for the purpose of euthanizing mice. Such approaches teach how a human can mix vinegar and baking soda to create the $CO_2$ gas. An example of such an approach is shown in FIG. 2. In the topmost images of FIG. 2 the first reactant is added to the enclosure 100. In the top image on the left side of the figure, sodium bicarbonate 202 (baking soda) is added first to the enclosure 100. In the top image on the right side of the figure, vinegar 204 is added first to the enclosure 100. In the middle images of FIG. 2, the animal 200 is placed into the enclosure 100 and the second reactant is added. In the middle left-side image vinegar 204 is added to the sodium bicarbonate 202. In the middle right-side image sodium bicarbonate 202 is added to the vinegar 204. In the bottom-most images of FIG. 2, the first and second reactants combine to form the gaseous euthanizing agent 208, in this $CO_2$, which euthanizes the animal 200 within the enclosure.

One issue of the approach depicted in FIG. 2 is, while the animal 200 is isolated from the reactants by the elevated floor 102, it is still possible that the animal 200 could come into direct or indirect contact with the one or more of the reactants 202, 204 as they are added to the enclosure 100 which could unnecessarily irritate or agitate the animal 200. For example, vinegar 204 could splash or slosh on the animal 200, furthermore, vinegar has a strong aroma that could irritate or agitate the animal 200. Furthermore, contact with a reactant could affect the ratio required to generate the necessary euthanizing agent.

Thus, what is needed is a device or mechanism to dispense the sodium bicarbonate and vinegar rapidly and nearly simultaneously with one canister into the enclosure 100, including means to prevent the animal 200 from direct contact with the reactants 202, 204.

SUMMARY

The present invention is directed toward further solutions to address this need, in addition to having other desirable characteristics. Specifically, a kit is provided for euthanizing animals such as rodents, insects, or other lab animals. The kit includes an enclosure and a canister. The enclosure is configured to hold one or more animals. The canister holds the reactants that are combined to form the euthanizing agent and provides a mechanism for the reactants to be delivered to and mixed together in the enclosure. The enclosure and canister are designed and configured to allow for the reactants to be added rapidly and nearly simultaneously into a chamber while preventing one or more animals held in the enclosure from direct contact with the reactants. The kit is also designed to be disposable after use. The kit is further designed in such a way that enables the use of key components with legacy animal enclosures.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
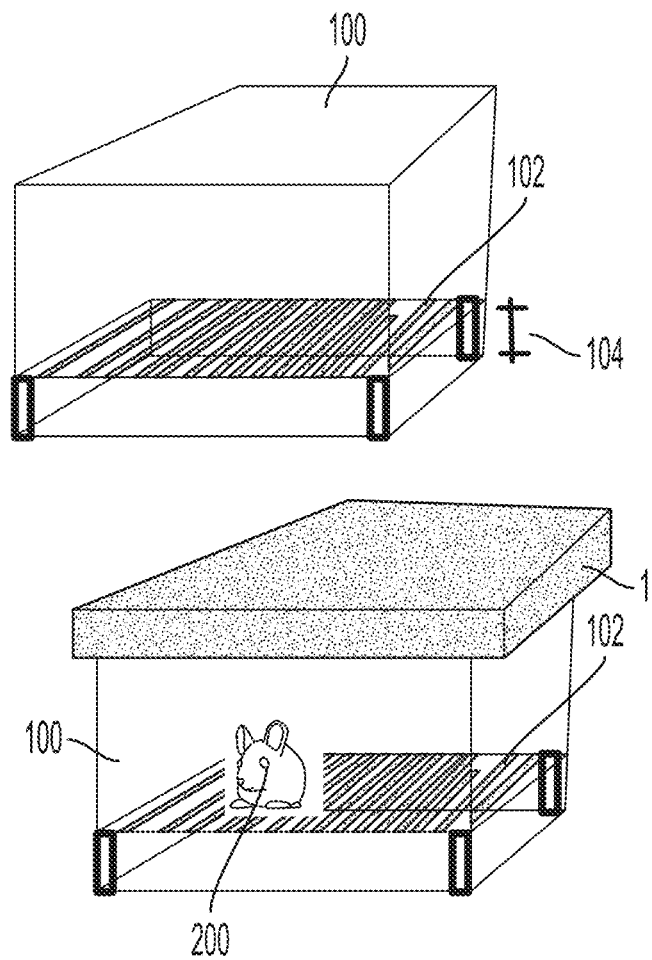
FIG. 1 is an example of an enclosure known in the art used for housing animals for experiments.
Figure 2:
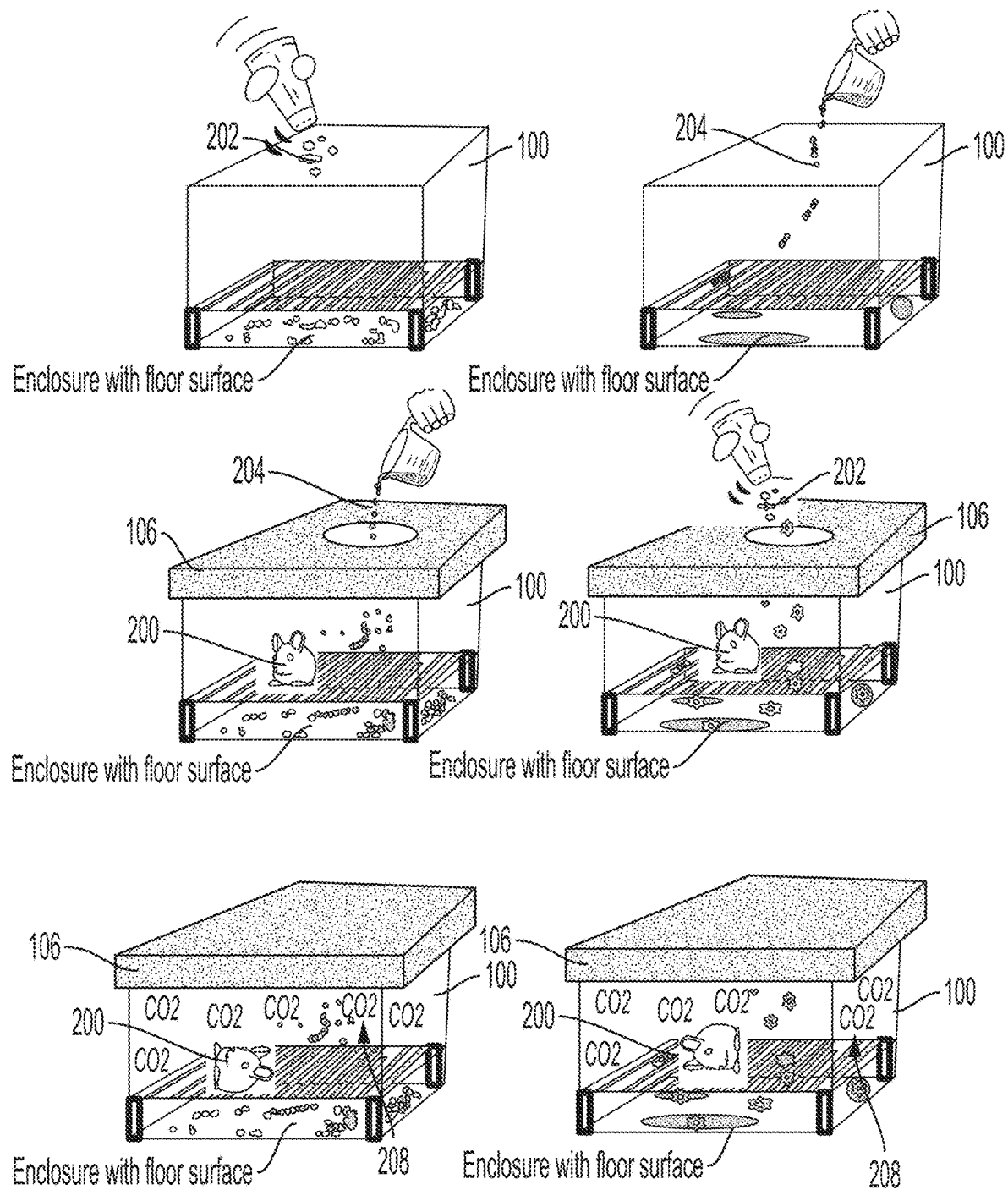
FIG. 2 is an example of a known technique of euthanizing an animal by combining sodium bicarbonate and vinegar in the enclosure to create carbon dioxide.

An illustrative embodiment of the present invention relates to a kit and method for euthanizing animals in which the reactants are added rapidly and nearly simultaneously with one canister into a chamber, utilizing means to prevent the animal from direct contact with the reactants but still experience exposure to the resulting gas.

FIG. 3 through FIG. 11, wherein like parts are designated by like reference numerals throughout, illustrate an example embodiment or embodiments of a kit and method for euthanizing one or more animals, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

A kit 300 includes an enclosure 302 and a canister 304. The enclosure 302 has a base 306, a top 308, and at least one sidewall 310 extending between the base 306 and the top 308 and defining a fully enclosed interior volume configured to confine one or more animals 200 therein. Notably, the enclosure 302 can be provided with the kit, or can be incorporated into the kit as a conventional or legacy enclosure with which key components of the kit 300 are utilized. A vented raised floor 312 is elevated above the base 306 of the enclosure 302 is provided therein. The raised floor 312 is positioned to split the interior volume into a habitation chamber 314 and a sub-chamber 316. The raised floor 312 comprises a plurality of venting apertures 318 providing venting between the habitation chamber 314 and the sub-chamber 316. A first access portal 320 is disposed through the top 308 of the enclosure 302 while a second access portal 322 is disposed through the raised floor 312. Notably, the first access portal 320 can be provided via a top 308 that fits on the enclosure 302 whether it is provided with the enclosure 302 or as a retrofit to a legacy enclosure 302. A conduit 324 extends between the first access portal 320 and the second access portal 322 fluidly coupling the first and second access portals. A spike 326 is mounted on the base 306 of the enclosure 302 with the sharp end 328 of the spike 326 oriented upward and in alignment with the conduit 324.

The canister 304 has a first end 330, a second end 332, and at least one sidewall 334 extending between the first end 330 and the second end 332 and defining a reactant chamber configured to hold reactants suitable for generating a gaseous euthanizing agent. The canister 304 is sized and dimensioned to be longer than the conduit 324 and to slide through the conduit 324 to the base 306. The canister 304 includes a first chamber 336 and a second chamber 338. The first chamber 336 holds a first reactant 340. The first chamber 336 has a first puncturable seal 342 offset from the first end 330 within the internal volume of the canister. The second chamber 338 holds a second reactant 344 in proximity to and separated from the first chamber 336 by the first puncturable seal 342. The second chamber has a second puncturable seal 346 in proximity to the second end 332 of the canister 304.

Figure 3:
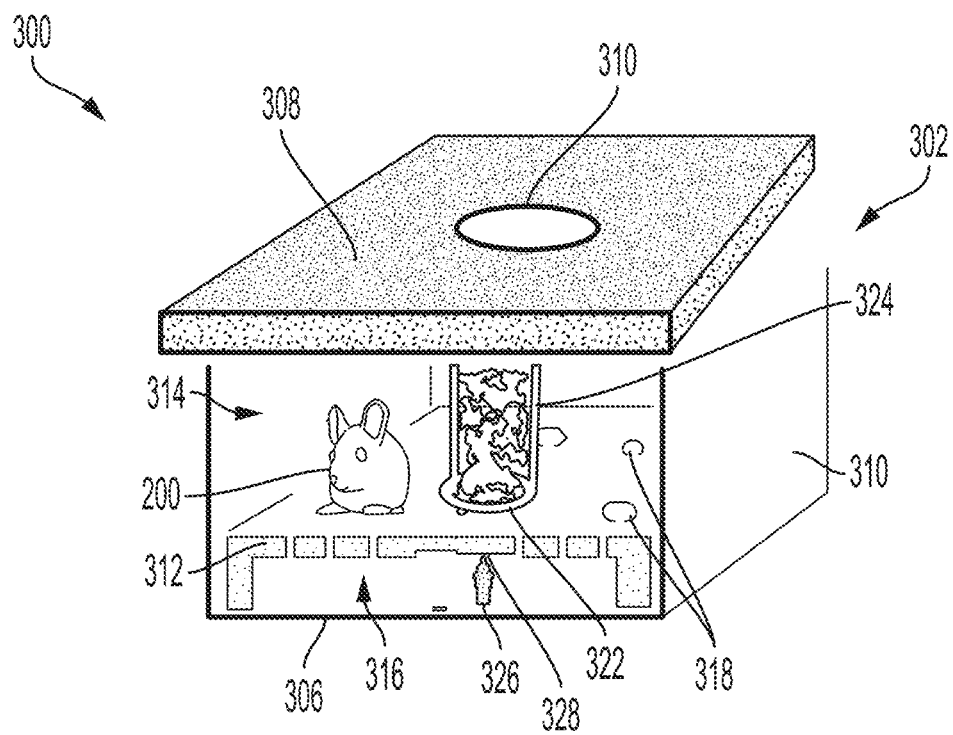
FIG. 3 is an exemplary kit for euthanizing animals in accordance with embodiments of the present invention.
Figure 3:
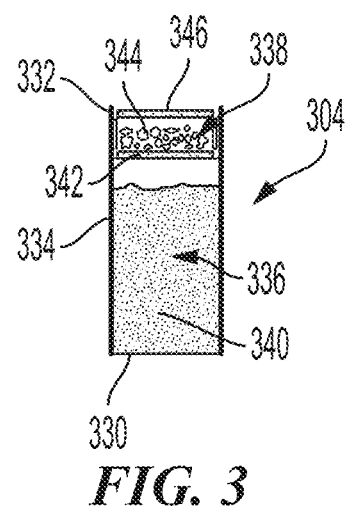

In certain embodiments, such as shown in FIG. 3, the enclosure 302 is a box. In some such embodiments, the box is 6 inches wide by 6 inches deep by 4 inches tall (6"×6"×4") or 15.24 centimeters (cm) wide by 15.24 centimeters (cm) deep by 10.16 centimeters tall. In some such embodiments, the box is 6 inches wide by 9 inches deep by 6 inches tall (6"×9"×9") or 15.24 centimeters (cm) wide by 22.86 centimeters (cm) deep by 15.24 centimeters (cm) tall. In still other such embodiments, other dimensions can be implemented to configure the enclosure 302 as desired and as would be well understood by those of skill in the art.

The enclosure 302 can be formed of one or more of cardboard, paper stock, plastic, metal, and/or glass, or a combination thereof. In certain embodiments, the enclosure 302 is formed of materials, such as cardboard, paper stock, plastic, or a combination that allows for the enclosure 302 to be affordable and/or disposable after use. Other shapes and configurations will be apparent to one skilled in the art given the benefit of this disclosure.

Figure 4:
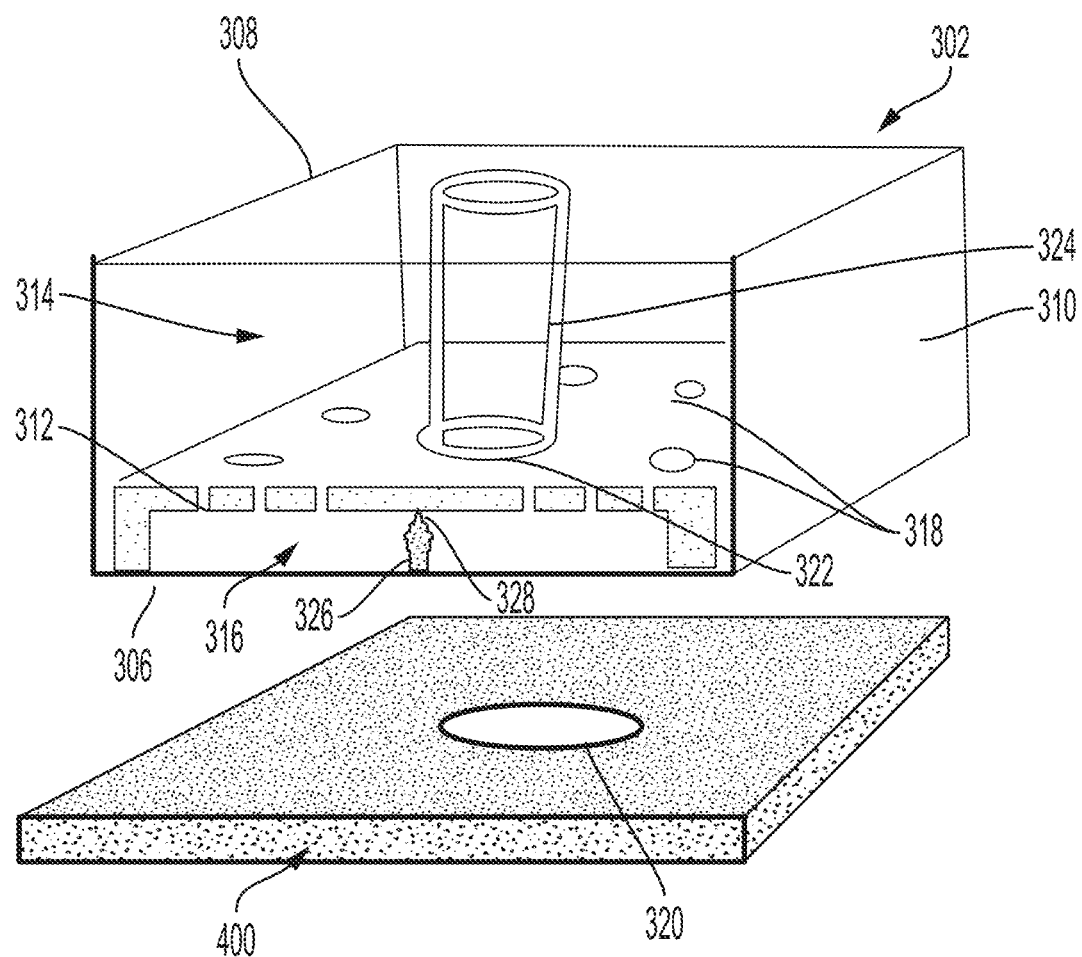
FIG. 4 depicts the enclosure of the kit of FIG. 3 showing a removable lid in accordance with embodiments of the present invention.
Figure 5:
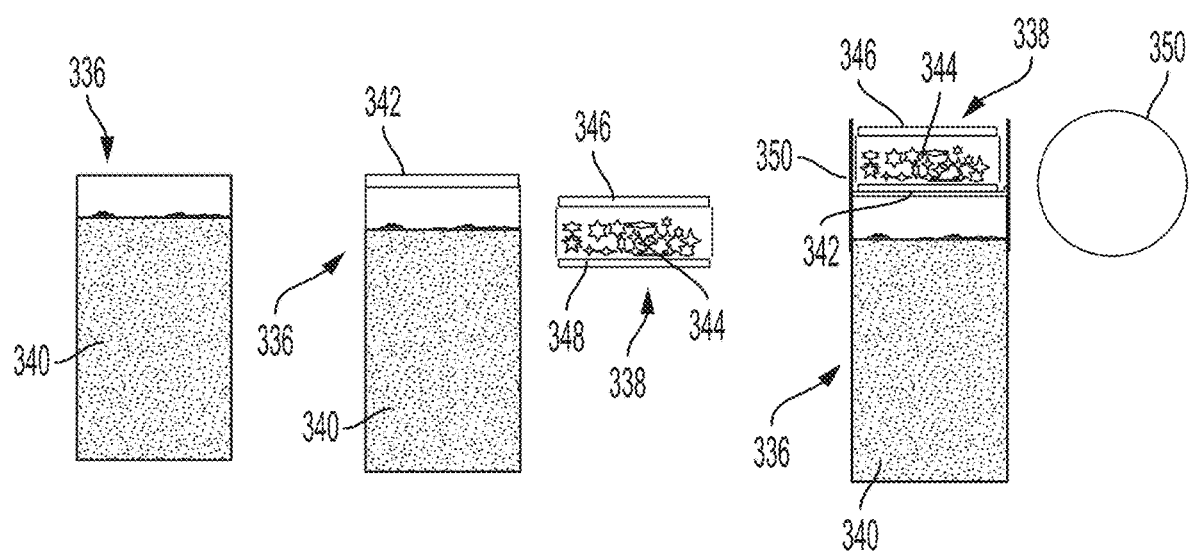
FIG. 5 depicts a canister of the kit of FIG. 3 in accordance with embodiments of the present invention.
Figure 6:
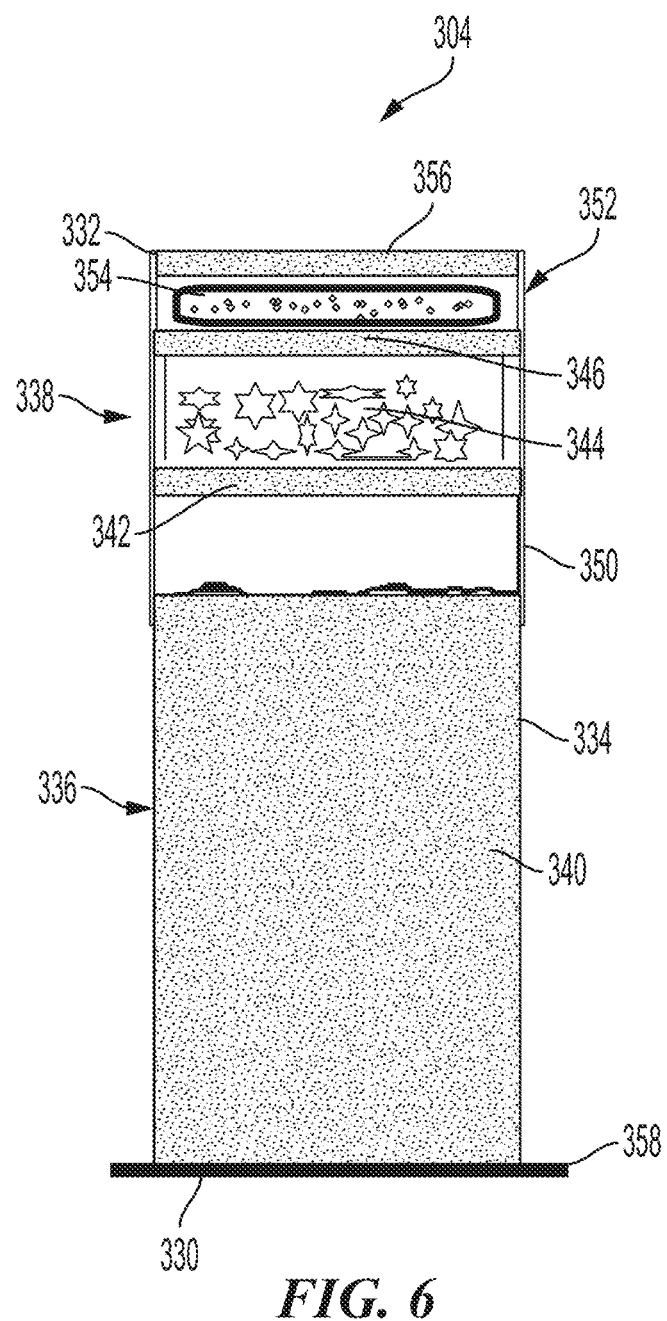
FIG. 6 depicts another embodiment of the canister in accordance with embodiments of the present invention.
Figure 7:
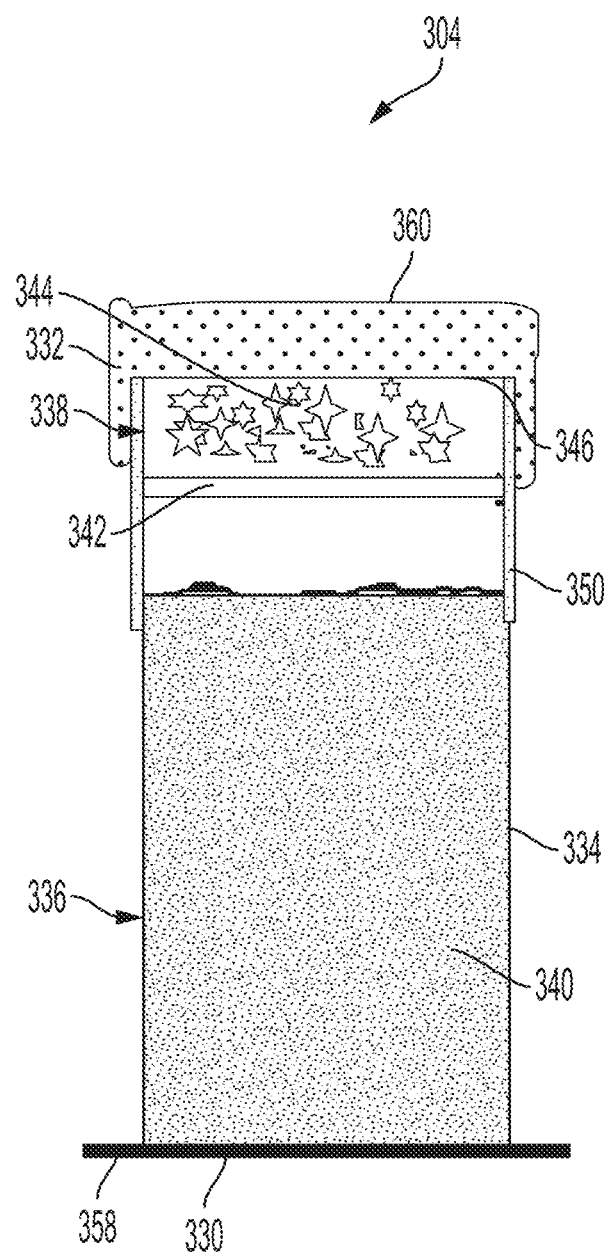
FIG. 7 depicts another embodiment of the canister having a protective cap in accordance with embodiments of the present invention.

In certain embodiments, the top 308 of the enclosure 302 comprises a removable top 308 as shown in FIG. 4. Here the removable top 308 allows for easy placement and removal of one or more animals 200 as well as cleaning and feeding within the enclosure 302. The enclosure 302 can be configured as a conventional laboratory mouse enclosure into which the vented raised floor 312 is inserted as would be readily appreciated by those of skill in the art with the benefit of the present disclosure. Likewise, the top 308 can be configured to mate with a legacy conventional laboratory mouse enclosure. In this way, the inventive system leverages conventional legacy animal enclosures, either with combinatorial implementations of key components of the present system with legacy enclosures and/or via a retrofit of key components of legacy enclosures, as would be understood by those of skill in the art. For instance, involving the kit of the present invention the vented raised floor 312 can be a separate platform placed in the bottom of a legacy enclosure. Likewise, the top 308 can be a retrofit top sized and dimensioned to mate with a legacy enclosure.

As set forth previously, the vented raised floor 312 splits the interior volume of the enclosure 302 into a habitation chamber 314 configured to hold the one or more animals 200 and a sub-chamber 316 for collecting animal waste and allowing reactants to mix without contact with the one or more animals 200. To achieve this separation, the vented raised floor 312 needs to be formed of a material rigid enough to support one or more animals 200 in the habitation chamber 314. As such, the vented raised floor 312 is formed of one or more of cardboard, paper stock, plastic, metal, or a combination thereof. In some such embodiments, the vented raised floor 312 is a screen, grate, or mesh. In other embodiments, the vented raised floor 312 is a sheet of rigid materials with apertures 318 formed therein. The apertures 318 are sized to allow for the passage of waste material and euthanizing gas between habitation chamber 314 and the sub-chamber 316 but prevent the passage of the one or more animals 200. In certain embodiments, the vented raised floor 312 is raised around one inch (1") above the base 306 of the enclosure 302. In some embodiments, the vented raised floor 312 is removable and/or replaceable. In some such embodiments, the enclosure 302 may include a support or shelf for holding the vented raised floor 312 in a raised position above the base 306. In other embodiments, the support for the offset of the vented raised floor 312 is part of the vented raised floor 312, such as folding tabs. In some embodiments, the vented raised floor can comprise or otherwise include one or more physiological measurement devices, such as an ECG device as disclosed in U.S. Pat. No. 10,959,399 entitled "DISPOSABLE AND MUTICONFIGURABLE HABITAT FOR OBTAINING PHYSIOLOGICAL MEASUREMENTS OF SMALL MAMMALS". Other configurations will be apparent to one skilled in the art given the benefit of this disclosure.

In certain embodiments, as seen in FIG. 3 and FIG. 4, the conduit 324 comprises a tube, and the first 320 and second 322 access portals comprise circular openings. In some such embodiments, the tube has a diameter of one inch (1") and extends from the vented raised floor 312 to the top 308 of the enclosure 302. The conduit 324 can be formed of cardboard, paper stock, plastic, metal, or combination thereof. The purpose of this conduit 324 is two-fold: 1) it prevents the one or more animals 200 from exploring or escaping through the first 320 or second 322 access portals and 2) it facilitates locating and guiding of the canister 304 and/or other material from above/outside the enclosure into the sub-chamber 316 below the vented raised floor 312. Other shapes and configurations will be apparent to one skilled in the art given the benefit of this disclosure.

The spike 326 is formed of metal, plastic, or other substantially hard material. In some embodiments, the spike 326 comprises a rod, post, or nail having a quarter-inch (0.25") or 6.35 millimeter (mm) diameter. In other embodiments, the spike 326 is formed of crystalized sugar. In other embodiments, the spike 326 comprises one or more barbs, thorns, sharps, pricks, etc., configured to tear or puncture items. The spike 326 can be inserted through or otherwise attached to the base 306 of the enclosure 302 such that the sharp end 328 extends into the conduit 324. Other shapes and configurations will be apparent to one skilled in the art given the benefit of this disclosure.

The canister 304 is a tube sized and dimensioned to fit within the conduit 324. Thus, the shape of the canister 304 is typically the same shape as the conduit 324. In the example of FIG. 3, the canister 304 is a tube having a diameter slightly smaller than the diameter of the tube of the conduit 324. The length of the canister 304 is such that it can extend at least the length of the conduit 324. The canister can be formed of any material capable of holding reactants used in the manufacture of euthanizing gas. Examples of such materials include metal, glass, plastic, coated or otherwise treated cardboard, corrugated, or paper stock, or any combination thereof. One or more of the first puncturable seal 342 and/or a second puncturable seal 346 are formed of a material strong enough to support the weight of the reactant stored within the first chamber 336 and/or the second chamber 338 so as to separate the reactants until the puncturable seals 342, 346 are punctured. The first puncturable seal 342 and/or second puncturable seal 346 can be formed of wax, paper, plastic, metal, or a combination thereof. In some such embodiments, the first puncturable seal 342 and/or second puncturable seal 346 is formed of a metal foil typical used to seal medical and/or food items.

In certain embodiments, the first reactant 340 is acetic acid (vinegar) and the second reactant 344 is sodium bicarbonate (baking soda) which combine to form carbon dioxide ($CO_2$) which is used as the euthanizing agent. The ratio of reactants depends on the reactants, resulting euthanizing agent, and the amount of euthanizing agent required to euthanize the one or more animals 200 (which may vary depending on animal 200 as well as the volume of enclosure 302). It should be understood that other reactants, euthanizing agents, ratios, combinations, and configurations are possible.

In certain embodiments, the first chamber 336 and second chamber 338 comprise separate components that are combined together to form the canister 304. An example of this can be seen in FIG. 5.

Here in the leftmost image, a side view of the first chamber 336 is shown, which is filled with a first reactant 340, in this case, acetic acid (vinegar). In the second image from the left, the first puncturable seal 342 has been placed on the first chamber 336 sealing the first reactant 340 inside and allowing for the addition of a second chamber 338. The second chamber 338 contains the second reactant 344, in this case, sodium bicarbonate (baking soda), and includes a second puncturable seal 346. Since in this embodiment, the second chamber 338 is formed separately from the first chamber 336, in this embodiment, the second chamber further includes an additional puncturable seal 348 opposite the second puncturable seal 346. When assembled, as shown in the second right-most image, the additional puncturable seal 348 sits upon and works in conjunction with, to provide the same function as, the first puncturable seal 342. The second chamber 338 is combined with and coupled to the first chamber 336. Here a ring, sleeve, or band 350 as shown in isolation in the right-most image is used to combine and/or couple the first chamber 336 and the second chamber 338.

In other embodiments, additional chambers can also be provided. An example of this can be seen in FIG. 6. Here a third chamber 352 holding other compounds 354 is provided in proximity to and separated from the second chamber 338 by the second puncturable seal 346. The third chamber 352 has a third puncturable seal 356. The provision of additional chambers allows for additional compounds in addition to the reactants to be administered to provide additional effects. In one embodiment, the third chamber 352 includes lavender oil, the vapor inhalation of which is thought to confer relaxing effects on subjects. In another embodiment, the third chamber 352 includes the liquid of isoflurane or sevoflurane, the vapors of which have profound anesthetic effects. In still other embodiments, the third chamber 352 comprises multiple chambers separated by a puncturable seal. This allows for additional chemical reactions, for example, the first of the multiple chambers can contain hydrogen peroxide and the second of the multiple chambers can contain yeast where the combination of hydrogen peroxide and yeast causes the synthesis of oxygen and water.

In some embodiments, the canister 304 further includes a flange 358 on the first end 330 of the canister 304. The flange 358 provides a wider more stable base for the storage of the canister 304. In addition, the flange 358 includes a diameter slightly bigger than the diameter of the first access portal 320 of the conduit 324 in which the canister 304 is inserted and is configured to mate with the first access portal 320 to provide a stop so that the canister 304 travels a fixed distance down the conduit 324. In one embodiment the flange 358 includes an adhesive to form a more permanent and or fluid-tight connection or seal between the flange 358 and the top 308 of the enclosure 302.

Figure 8:
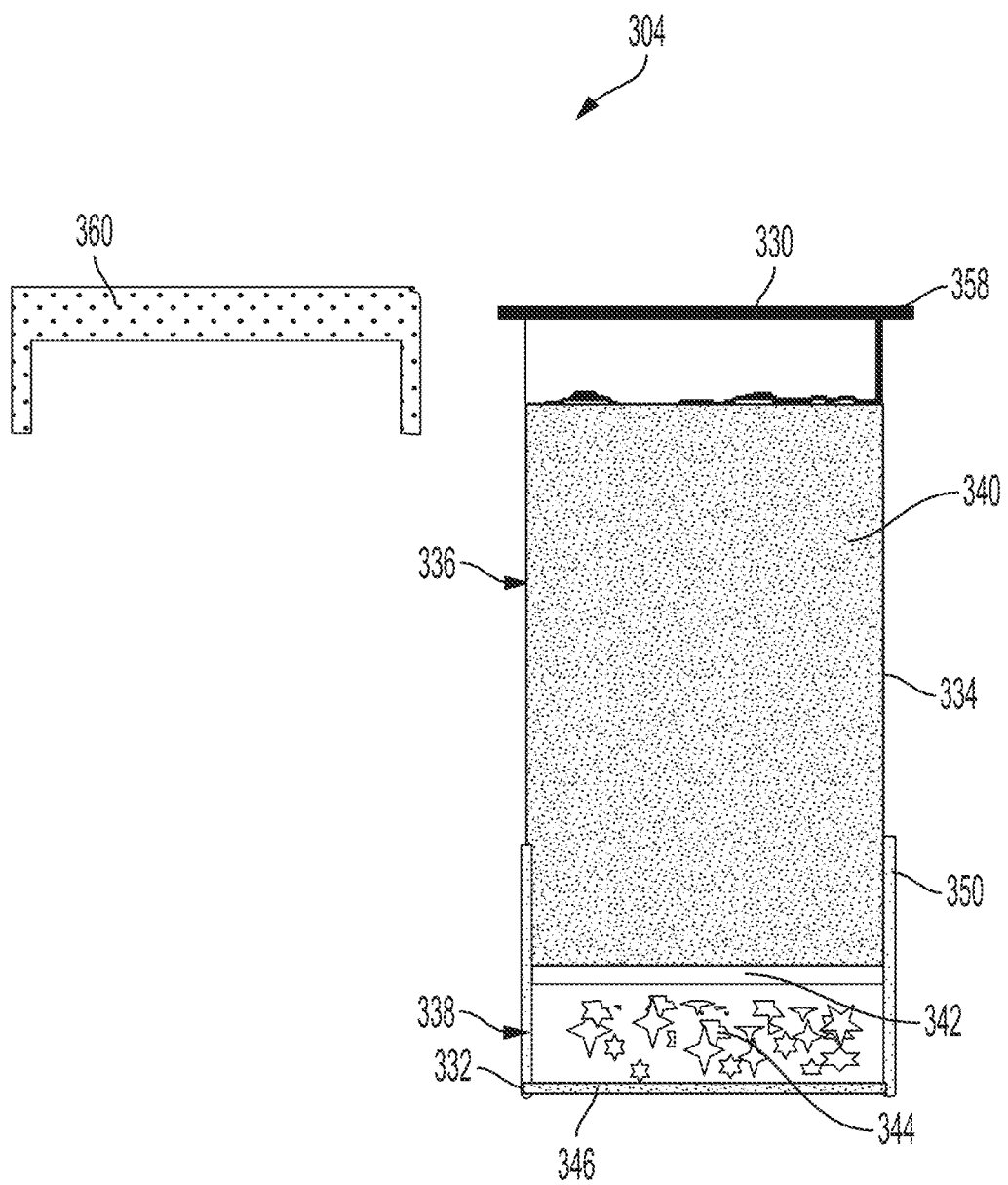
FIG. 8 depicts the canister of FIG. 7 with the protective cap removed and the canister inverted for insertion into the enclosure of the kit in accordance with embodiments of the present invention.

In certain embodiments, the canister 304 is further provided with a cover 360 for the second end 332 of the canister 304. An example of this can be seen in FIG. 7 and FIG. 8. When placed over the second end 332, the cover 360 protects the puncturable seals 346, 342 from being inadvertently damaged or compromised before use. When the canister 304 is to be used, the cover 360 can be removed and the canister 304 inverted as seen in FIG. 8. The first puncturable seal 342 and second puncturable seal 346 have sufficient strength to contain the first reactant 340 in the first chamber 336 and the second reactant 344 in the second chamber 338 when the canister 304 is inverted. In this inverted state, the canister 304 can be inserted into the conduit 324 so that the sharp end 328 of the spike 326 can engage the second end 332 of the canister and puncture the second puncturable seal 346 and the first puncturable seal 342 allowing the release and mixture of the first reactant 340 and second reactant 344 to form the euthanizing agent gas 362. This interaction is depicted in FIG. 9.

Figure 9:
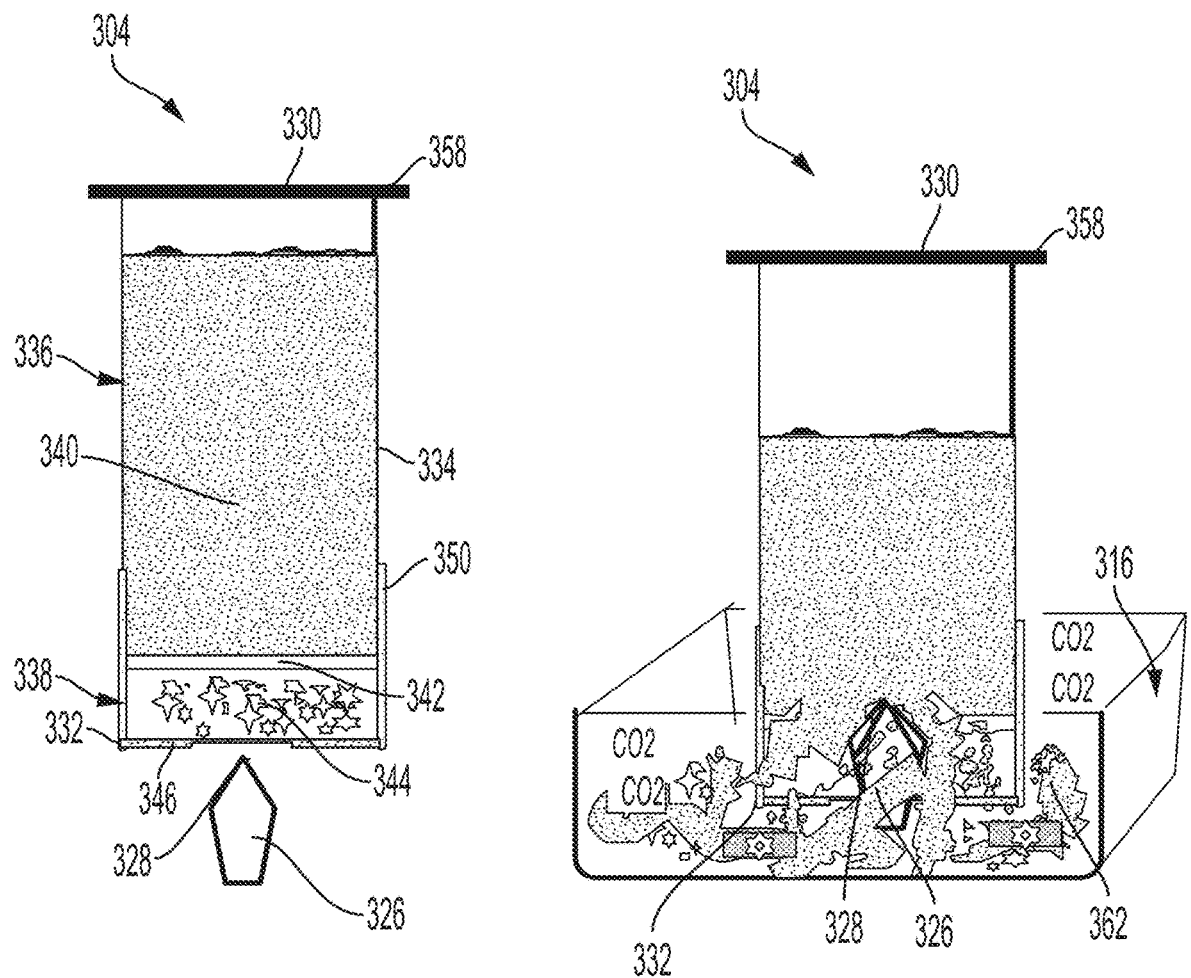
FIG. 9 depicts the interaction of the canister with the spike of the enclosure kit in accordance with embodiments of the present invention.
Figure 10:
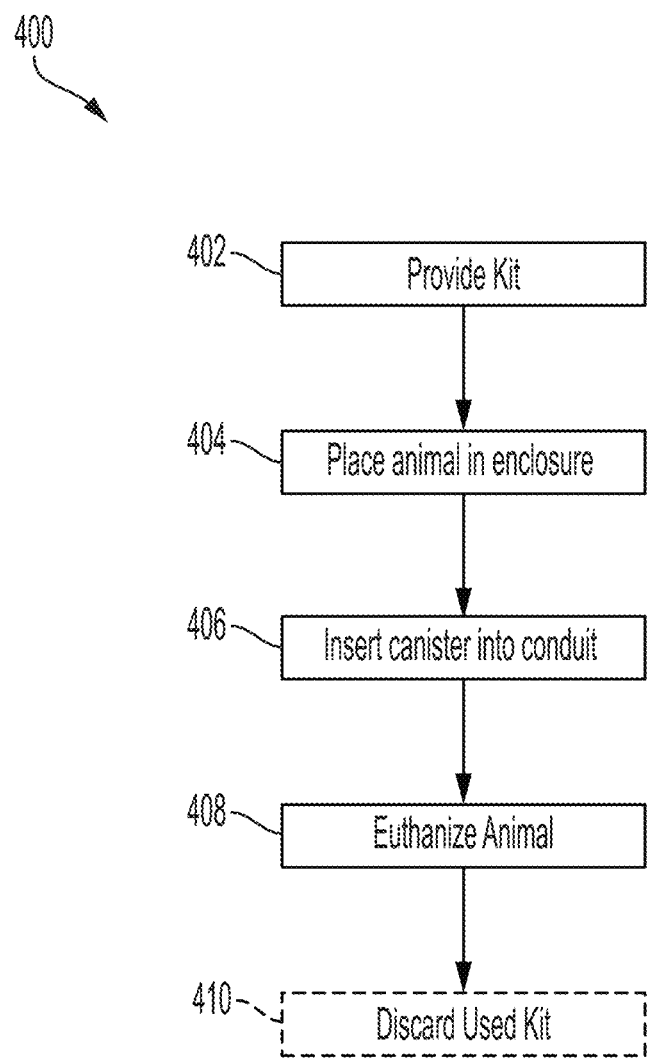
FIG. 10 depicts a flow diagram for a method of euthanizing animals using a kit in accordance with embodiments of the present invention.
Figure 11:
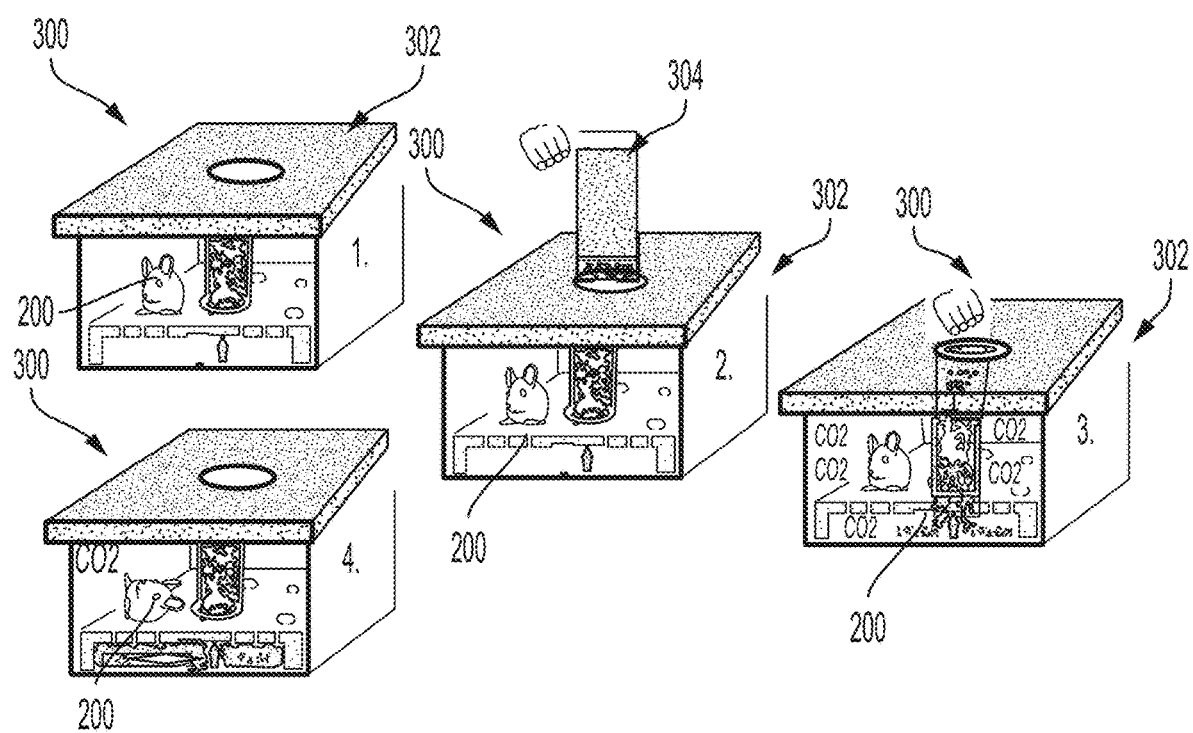
FIG. 11 depicts the utilization of the kit to euthanize an animal as set forth in FIG. 10.

In the left image of FIG. 9, the inverted canister 304 is positioned above the spike 326. In the right image of FIG. 9, the sharp end 328 of the spike 326 has punctured the second puncturable seal 346 and the first puncturable seal 342 allowing the release and mixture of the first reactant 340 and second reactant 344 to form the euthanizing agent gas 362 in the sub-chamber 316 of the enclosure 302. In certain embodiments, the movement of one or more animals 200 within the enclosure causes or otherwise assists in the mixing of the first reactant 340 and second reactant 344. In some such embodiments, the heightened escape-desiring activity of the mouse causes mechanical mixing. FIG. 10 and FIG. 11 depict the use of a kit 300 to euthanize an animal 200. FIG. 10 depicts a flow diagram of the method and FIG. 11 depicts the use of the kit 300 in performing the steps of the method of FIG. 10. The images of FIG. 11 are labeled 1-4 showing the order of operation.

In the first step of the method 400 as set forth in FIG. 10, a kit 300 as described herein is provided (Step 402). One or more animals 200 can then be placed in the enclosure 302 of the kit 300 (Step 404). An example of the kit 300 holding an animal can be seen in the first image of FIG. 11. The canister 304 is then inserted into the conduit 324 of the enclosure 302 (Step 406). This is shown in the second and third images of FIG. 11. The second end 332 of the canister 304 is inserted into the first access portal 320, through the conduit 324, and pushed down to the base 306. The spike 326 at the base 306 within the conduit 324 intersects with and punctures the second puncturable seal 346 and the first puncturable seal 342 causing the first reactant 340 stored in the first chamber 336 to mix with the second reactant 344 in the second chamber 338 and generate the gaseous euthanizing agent 362. The resulting gaseous euthanizing agent passes through the sub-chamber 316, through the vented raised floor 312 to the habitation chamber 314 thereby euthanizing the one or more animals 200 held within the habitation chamber 314 of the enclosure 302 (Step 408). This can be seen in the fourth and final image of FIG. 11. In certain embodiments, the used kit 300 (including the deceased animal 200) may then be discarded or otherwise disposed of (Step 410).

The kit 300 of the present invention includes an enclosure 302 in which the one or more animals 200 can voluntarily enter, or be purposely placed, in either case not able to escape. Additionally, the one or more animals are responsible for activating the mixture of the reactants to generate the euthanizing gas. The interior of the chamber includes artifices to entice the animal to cause the reaction to occur. Examples of the artifices can include but are not limited to a lever with a barb on one end where depression of the lever by the animal causes the barb on the other end to disperse one or more of the reactants. Additionally, the separate packaging arrangement ensures the enclosure and canister are designed and configured to allow for the reactants to be added rapidly and nearly simultaneously into a chamber while preventing one or more animals held in the enclosure from direct contact with the reactants. Further, the enclosure 302 and canister 304 can be made from inexpensive materials allowing for kit 300 to single-use and disposable.

In a different embodiment, the canister is provided in sufficiently larger quantities to generate sufficiently larger amounts of $CO_2$ within relatively enclosed spaces, such as partially enclosed patios and decks, to disrupt the wellness of air-breathing organisms, and terminate the lives of mosquitoes.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A kit for euthanizing animals, the kit comprising:
an enclosure, comprising:
a base, a top, and at least one sidewall extending between the base and the top and defining a fully enclosed interior volume configured to confine one or more animals therein;
a vented raised floor elevated above the base of the enclosure, the vented raised floor positioned to split the interior volume into a habitation chamber and a sub-chamber, and the vented raised floor comprising a plurality of venting apertures providing venting between the habitation chamber and the sub-chamber;
a first access portal disposed through the top, a second access portal disposed through the vented raised floor, and a conduit fluidly coupling the first access portal with the second access portal; and
a spike mounted on the base of the enclosure, a sharp end of the spike oriented upward and in alignment with the conduit; and
a canister, comprising:
a first end, a second end, and at least one sidewall extending between the first end and the second end and defining a reactant chamber configured to hold reactants suitable for generating a gaseous euthanizing agent, the canister sized and dimensioned to be longer than the conduit and to slide through the conduit to the base, the canister comprising:
a first chamber holding a first reactant, the first chamber having a first puncturable seal offset from the first end within an internal volume of the canister; and
a second chamber holding a second reactant in proximity to and separated from the first chamber by the first puncturable seal, the second chamber having a second puncturable seal in proximity to the second end of the canister;
wherein when the second end of the canister is inserted through the conduit and pushed down to the base, the spike intersects with and punctures the second seal and the first seal causing the first reactant stored in the first chamber to mix with the second reactant in the second chamber to generate the gaseous euthanizing agent; and
wherein the gaseous euthanizing agent passes through the sub-chamber, through the vented raised floor to the habitation chamber, thereby euthanizing the one or more animals held within the habitation chamber.

2. The kit of claim 1, wherein the top comprises a removable lid.

3. The kit of claim 1, wherein the first reactant comprises acetic acid and the second reactant comprises sodium bicarbonate such that the euthanizing agent comprises carbon dioxide.

4. The kit of claim 1, wherein the conduit comprises a tube and the first and second access portals comprise circular openings.

5. The kit of claim 1, wherein the enclosure comprises a box.

6. The kit of claim 1, wherein the enclosure is formed or one or more of cardboard, paper stock, plastic, metal, and glass.

7. The kit of claim 1, wherein the vented raised floor is formed of one or more of cardboard, paper stock, plastic, and metal.

8. The kit of claim 1, wherein the vented raised floor comprises a physiological measurement device.

9. The kit of claim 1, wherein the spike is formed of one or more of metal, plastic, and crystal sugar.

10. The kit of claim 1, wherein the canister comprises a tube.

11. The kit of claim 1, wherein the canister further comprises a flange on the first end configured to mate with the first access portal when the canister is inserted through the conduit so as to create a seal.

12. The kit of claim 1, wherein one or more of the first puncturable seal and second puncturable seal comprises one or more of wax, paper, plastic, or metal.

13. The kit of claim 1, wherein the second chamber of the canister further includes an additional puncturable seal sealing the second reactant within the second chamber and allowing the second chamber to be formed separate from the first chamber.

14. The kit of claim 1, wherein the canister further comprises a removable cover fitted over the second end which is removed before the second end is inserted through the conduit.

15. The kit of claim 1, wherein the canister further comprises a third chamber holding other compounds in proximity to and separated from the second chamber by the second puncturable seal, the third chamber having a third seal.

16. The kit of claim 15, where the other compounds comprise lavender oil.

17. The kit of claim 15, wherein the other compounds comprise isoflurane or sevoflurane.

18. The kit of claim 15, wherein the third chamber further comprises multiple chambers separated by a puncturable seal.

19. The kit of claim 18, wherein the first of the multiple chambers contains hydrogen peroxide and the second of the multiple chambers contains yeast.

20. The kit of claim 1, wherein the enclosure is configured such that when there is movement of the one or more animals held in the enclosure, the movement causes mixing of the first reactant with the second reactant to form the gaseous euthanizing agent.

21. A method of euthanizing animals, the method comprising:
providing a euthanizing kit, the kit comprising:
an enclosure, comprising:
a base, a top, and at least one sidewall extending between the base and the top and defining a fully enclosed interior volume configured to confine one or more animals therein;
a vented raised floor elevated above the base of the enclosure, the vented raised floor positioned to split the interior volume into a habitation chamber and a sub-chamber, and the vented raised floor comprising a plurality of venting apertures providing venting between the habitation chamber and the sub-chamber;
a first access portal disposed through the top, a second access portal disposed through the vented raised floor, and a conduit fluidly coupling the first access portal with the second access portal; and
a spike mounted on the base of the enclosure, a sharp end of the spike oriented upward and in alignment with the conduit; and
a canister, comprising:
a first end, a second end, and at least one sidewall extending between the first end and the second end and defining a reactant chamber configured to hold reactants suitable for generating a gaseous euthanizing agent, the canister sized and dimensioned to be longer than the conduit and to slide through the conduit to the base, the canister comprising:
- a first chamber holding a first reactant, the first chamber having a first puncturable seal offset from the first end within an internal volume of the canister; and
- a second chamber holding a second reactant in proximity to and separated from the first chamber by the first puncturable seal, the second chamber having a second puncturable seal in proximity to the second end of the canister;

placing one or more animals within the enclosure; and inserting the second end of the canister through the first access portal into the conduit and pushing the canister down to the base such that the spike intersects with and punctures the second seal and the first seal causing the first reactant stored in the first chamber to mix with the second reactant in the second chamber and generate the gaseous euthanizing agent;

wherein the gaseous euthanizing agent passes through the sub-chamber, through the vented raised floor to the habitation chamber thereby euthanizing the one or more animals held within the habitation chamber.

* * * * *